(12) United States Patent
Can et al.

(10) Patent No.: US 11,563,852 B1
(45) Date of Patent: Jan. 24, 2023

(54) SYSTEM AND METHOD FOR IDENTIFYING COMPLAINTS IN INTERACTIVE COMMUNICATIONS AND PROVIDING FEEDBACK IN REAL-TIME

(71) Applicant: Capital One Services, LLC, McLean, VA (US)

(72) Inventors: Aysu Ezen Can, Cary, NC (US); Adam Faulkner, New York, NY (US); Maury Courtland, Durham, NC (US); David Chen, Durham, NC (US); Jonathan Galsurkar, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/402,027

(22) Filed: Aug. 13, 2021

(51) Int. Cl.
*H04M 3/00* (2006.01)
*H04M 3/51* (2006.01)
*G10L 15/08* (2006.01)
*H04M 3/523* (2006.01)

(52) U.S. Cl.
CPC .......... *H04M 3/5175* (2013.01); *G10L 15/08* (2013.01); *H04M 3/523* (2013.01)

(58) Field of Classification Search
CPC ...... H04M 3/5175; H04M 3/523; G10L 15/08
USPC .................................. 379/243, 244, 201.01
See application file for complete search history.

(56) References Cited

U.S. PATENT DOCUMENTS

| | | | |
|---|---|---|---|
| 8,411,155 B2 * | 4/2013 | Yumiki | H04N 5/23248 348/208.99 |
| 9,118,763 B1 * | 8/2015 | Margulies | G06Q 30/016 |
| 9,129,008 B1 * | 9/2015 | Kuznetsov | G06F 16/438 |
| 9,477,975 B2 * | 10/2016 | Lawson | H04M 15/7655 |
| 9,648,171 B1 * | 5/2017 | Eftekhari | H04M 3/5232 |
| 9,900,436 B2 | 2/2018 | Raanani et al. | |
| 10,645,224 B2 | 5/2020 | Dwyer et al. | |
| 10,896,428 B1 | 1/2021 | Balasubramaniam et al. | |
| 10,990,760 B1 * | 4/2021 | Monnett | G06F 40/295 |
| 2006/0122834 A1 * | 6/2006 | Bennett | G10L 15/1822 704/E15.047 |
| 2010/0179950 A1 * | 7/2010 | Willcock | G16H 50/20 707/723 |
| 2010/0278318 A1 * | 11/2010 | Flockhart | H04M 3/51 379/265.09 |
| 2010/0332287 A1 | 12/2010 | Gates et al. | |
| 2011/0010173 A1 * | 1/2011 | Scott | G10L 21/10 704/235 |

(Continued)

*Primary Examiner* — William J Deane, Jr.
(74) *Attorney, Agent, or Firm* — Sterne, Kessler, Goldstein & Fox P.L.L.C.

(57) ABSTRACT

Disclosed herein are system, method, and computer program product embodiments for machine learning systems to process incoming call-center calls based on inferred sentiments. An incoming call is routed to a call agent based on an inferred topic, classified based on one or more inferred sentiments of a current caller's speech, determining, based on the call classification, that a complaint has been articulated and initiating an automated assistance by searching for one or more similar callers to the current caller. Based on finding a successful call outcome associated with one or more similar callers, the system suggests one or more phrases to the call agent for use in a dialog with the current caller to improve the one or more inferred sentiments.

17 Claims, 9 Drawing Sheets

(56) References Cited

U.S. PATENT DOCUMENTS

| | | | |
|---|---|---|---|
| 2011/0307257 A1* | 12/2011 | Pereg | G06Q 10/063 704/E15.005 |
| 2014/0254775 A1* | 9/2014 | O'Connor | H04M 3/5175 379/265.09 |
| 2017/0054848 A1* | 2/2017 | Meng | H04M 3/5233 |
| 2019/0156838 A1* | 5/2019 | Kannan | G10L 15/22 |
| 2019/0253558 A1 | 8/2019 | Haukioja et al. | |
| 2020/0089767 A1* | 3/2020 | Ni | G06Q 30/016 |
| 2020/0159829 A1* | 5/2020 | Zhao | G06T 11/206 |
| 2021/0004836 A1 | 1/2021 | Adibi et al. | |
| 2021/0005217 A1* | 1/2021 | Deole | H04M 3/4286 |
| 2021/0158813 A1* | 5/2021 | Sivasubramanian | G06Q 30/016 |
| 2021/0337065 A1* | 10/2021 | Lee | G10L 25/63 |

* cited by examiner

700

AGENT VIEW

"I understand your frustration with the late payment process. I would love to help. We receive lots of good feedback from customers about the 'installment program' with X% interest. Would you like to hear more about this option?"

706

Important alert — 708

702

CUSTOMER PROFILE

Sentiment: Frustrated
Sentiment score: 2
Downward Trajectory from score=4
Tier 1 Complaint Detected
Two Groups of similar customers found
Most similar customers are interested in installments program

AGENT VIEW

"Finding the right options in the mobile app can definitely be tiring. I would be happy to walk you through viewing past statements. Would you be interested in that?" 806

Helpful Support 808

802

CUSTOMER PROFILE

Sentiment: Tired
Aspect: Mobile App
Sentiment Score: 3
Downward Trajectory from score=5
No Tier 1 Complaints yet
Likelihood of upcoming complaint: high
Three Groups of similar customers found
Most similar customers are interested in "mobile application"
Those customers were helped by 'discussing/ viewing past statements'

SYSTEM AND METHOD FOR IDENTIFYING COMPLAINTS IN INTERACTIVE COMMUNICATIONS AND PROVIDING FEEDBACK IN REAL-TIME

BACKGROUND

Text and speech may be analyzed by computers to discover words and sentences. However, missing in current computer-based text/speech analyzers is an ability to properly recognize tone, changes in tone, underlying emotions, emotional states or emotional trends of the writer or speaker. For example, text or emails communicated to another person leave recognition of tone to the receiver. However, the receiver may misinterpret the intended tone/emotion based on his or her own experiences or current emotional state. As a consequence, they may assign an unintended meaning to the communication. What is needed is a technical solution to derive user information related to tone or emotions from an interactive communication and leverage this information to provide real-time responses to affect the interactive communications.

BRIEF DESCRIPTION OF THE DRAWINGS

The accompanying drawings are incorporated herein and form a part of the specification.

FIG. 7 is an example of real-time call agent assistance, according to some embodiments.

FIG. 8 is another example of real-time call agent assistance, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
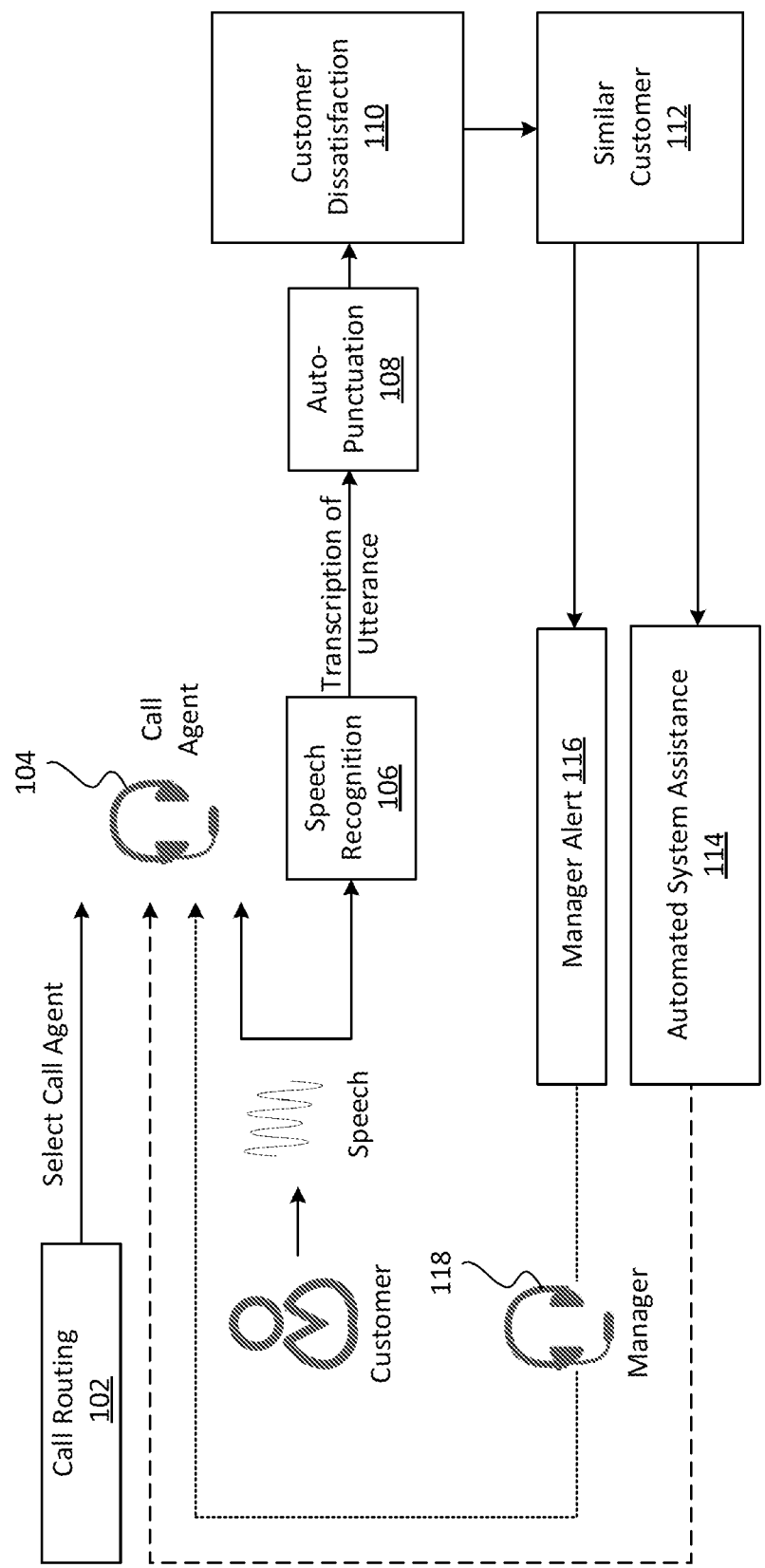
FIG. 1 is a flow diagram for a call center system processing an incoming call, according to some embodiments.

Provided herein are system, apparatus, device, method and/or computer program product embodiments, and/or combinations and sub-combinations thereof to provide real-time support to call center agents to improve customer experience. Customer experience is core to many businesses and a crucial aspect of a positive customer experience may be solving customers' problems in a quick and effective manner. Additionally, there is business value in improving customer experience in terms of both company reputation and customer retention.

Customer call centers lie at the heart of the interaction between businesses and their customers. Businesses receive calls every month that involve customer-agent interactions that address customer issues and complaints ranging from a straightforward address-change request to more emotion-laden interactions involving, for example, a hardship-based fee reduction request. Resolving such issues is complex because it requires understanding customers, providing information (in terms of relevance, quantity, and scope), and quickly finding a solution. Call center agents are a precious resource: costly and limited in number. Therefore, it is of the utmost importance to provide them as much assistance as possible during calls so that interactions are fast, resolve the issue, and provide a top-notch customer experience.

Real-time assistance is key to providing the best support to agents. In various embodiments, assistance is provided while a call is in progress in order to improve customer interaction in real time.

In some embodiments, the call processing system provides useful information for the current call, identifies similar customers and the actions that resolved their problems, and provides automated language suggestions the agent can use with the current customer.

In some embodiments, the technology described herein includes a plurality of machine learning models related to customer experience combined in an infrastructure to support call center agents in real-time while interacting with customers.

In some embodiments, the technology described herein provides processing of incoming call-center calls based on inferred (machine learning model) sentiments. For example, an incoming call is routed to a call agent based on an inferred topic (call routing machine learning model). This call is recorded, punctuated and classified based on one or more inferred sentiments (real-time customer dissatisfaction machine learning model) of a current caller's speech. The real-time customer dissatisfaction machine learning model determines, based on the call classification, that a complaint has been articulated and initiates an automated assistance (automated assistance machine learning model) by searching for one or more similar callers to the current caller. Successful call outcomes associated with one or more similar callers may be used to suggest one or more previously successful phrases to the call agent for use in a dialog with the current caller to improve the one or more inferred sentiments. Therefore, the technology described herein improves the technology associated with handling calls by, at a minimum, properly capturing caller sentiment and subsequently detected sentiment trends and call solutions. Properly captured sentiment, as described herein, is one element leading to higher correlated solutions. As such, the technology described herein improves how a computer identifies a caller's sentiment, thereby improving the operation of the computer system itself.

In some embodiments, the machine learning system classifies the sentiment of customer speech and, if a negative sentiment is detected, identifies a negative emotion (anger, confusion, discontent, or dissatisfaction) present. The system extracts services, features, and topics mentioned by customers and identifies one or more categories of sentiment attributed to each of these. Once it is determined that a customer complaint has been articulated, it is determined whether feedback is necessary. The system predicts a sentiment score of each utterance as it occurs and provides a real-time analysis of a resulting trend to determine if automated help is required. An automated assistance module searches for customers similar to the current caller using a Customer Profile (CP) as a unit of analysis (an aggregate of all information regarding the customer), finds customers with similar profiles and summarizes which actions helped those customers. The automated assistance module suggests phrases that the agent can use in their current dialogue with the customer. Optionally, call center managers may be alerted so that they can decide whether to tune in to a particularly problematic call or to provide help.

FIG. 1 illustrates an example call center system 100 processing an incoming interactive communication such as a customer call, as per some embodiments. System 100 can be implemented by hardware (e.g., switching logic, communications hardware, communications circuitry, computer processing devices, microprocessors, dedicated logic, programmable logic, microcode, etc.), software (e.g., instructions executing on a processing device), or a combination thereof. It is to be appreciated that not all modules may be needed to perform the disclosure provided herein. Further, some of the processes described may be performed simultaneously, or in a different order or arrangement than shown in FIG. 1, as will be understood by a person of ordinary skill in the art.

System 100 shall be described with reference to FIG. 1. However, system 100 is not limited to this example embodiment. In addition, system 100 will be described at a high level to provide an overall understanding of one example call flow from incoming call to call agent assistance. Greater detail will be provided in the figures that follow.

Call center calls are routed to a call agent 104 through a call routing module 102. Call routing module 102 may analyze pre-call information, such as a caller's profile, previous call interactions, voice menu selections or inputs to automated voice prompts. Call agents may be segmented into groups by subject matter expertise, such as experience with specific subjects or subject matter customer complaints. Understanding which call agent to route the incoming call to may ultimately determine a successful outcome, reduced call time and enhance a customer's experience. In an embodiment, the call agent may be a chatbots(s) or other equivalent, communication entity.

Once a call agent 104 is selected, speech recognition module 106 may analyze the incoming caller's speech in real time by sequentially analyzing utterances. Utterances may include a spoken word, statement, or vocal sound. However, utterances may be difficult to analyze without a proper understanding of how, for example, one utterance relates to another utterance. Languages follow known constructs (e.g., semantics), patterns, rules and structures. Therefore, these utterances may be analyzed using a systematic approach. One way to increase an understanding of utterances is to aggregate one or more utterances into related structures (segments). Auto-punctuation module 108 may add punctuation to segments of utterances, thus grouping them into sentences, partial sentences or phrases. For example, the sequential utterances " . . . problem with my credit card . . . " may have two different meanings based on punctuation. In a first scenario, punctuation after the word credit ("problem with my credit. Card . . . ") would indicate a credit issue. In a second scenario, punctuation after the word card ("problem with my credit card") would indicate a credit card issue. Therefore, intelligent punctuation may suggest to the system contextual relevancy needed to properly address caller issues.

Customer dissatisfaction module 110 subsequently analyzes the punctuated segments to determine, based on sentiments of the call and the language choice of customer during the call, whether a complaint is being voiced. Customer dissatisfaction module 110 may classify a detected complaint based on any of: emotions detected, subject matter detected, sound volume, or intensity of the call utterances. For example, an agitated caller may raise their voice, increase the speed or intensity of their speech, or use words depicting anger. Therefore, the technology described herein improves the technology associated with handling calls by, at a minimum, properly capturing caller sentiment and subsequently detected sentiment trends, complaints and call solutions. Properly captured sentiment, as described herein, is one element leading to higher correlated solutions.

For detected complaints, similar customer module 112 searches for similar customers with similar issues and successful resolutions of previous complaints. Automated system assistance module 114 subsequently analyzes these successful resolutions to determine which actions may have contextually contributed (e.g., based on relevance) to the success. In some embodiments, actions that are considered relevant to the success are selected and communicated to call agent 104. For example, call agent 104 may receive a list of actions displayed on their computer screen. Phrases may include, or be combined with, negative sentiment/emotion diffusing phrases or additional contextual information, such as product descriptions, product suggestions, customer options or steps that may provide technical assistance.

If a sentiment score returned by the customer dissatisfaction module 110 exceeds a predetermined threshold, a manager alert module 116 may be triggered to provide experienced managerial level assistance (manager 118) for the agent in handling the complaint.

Figure 2:
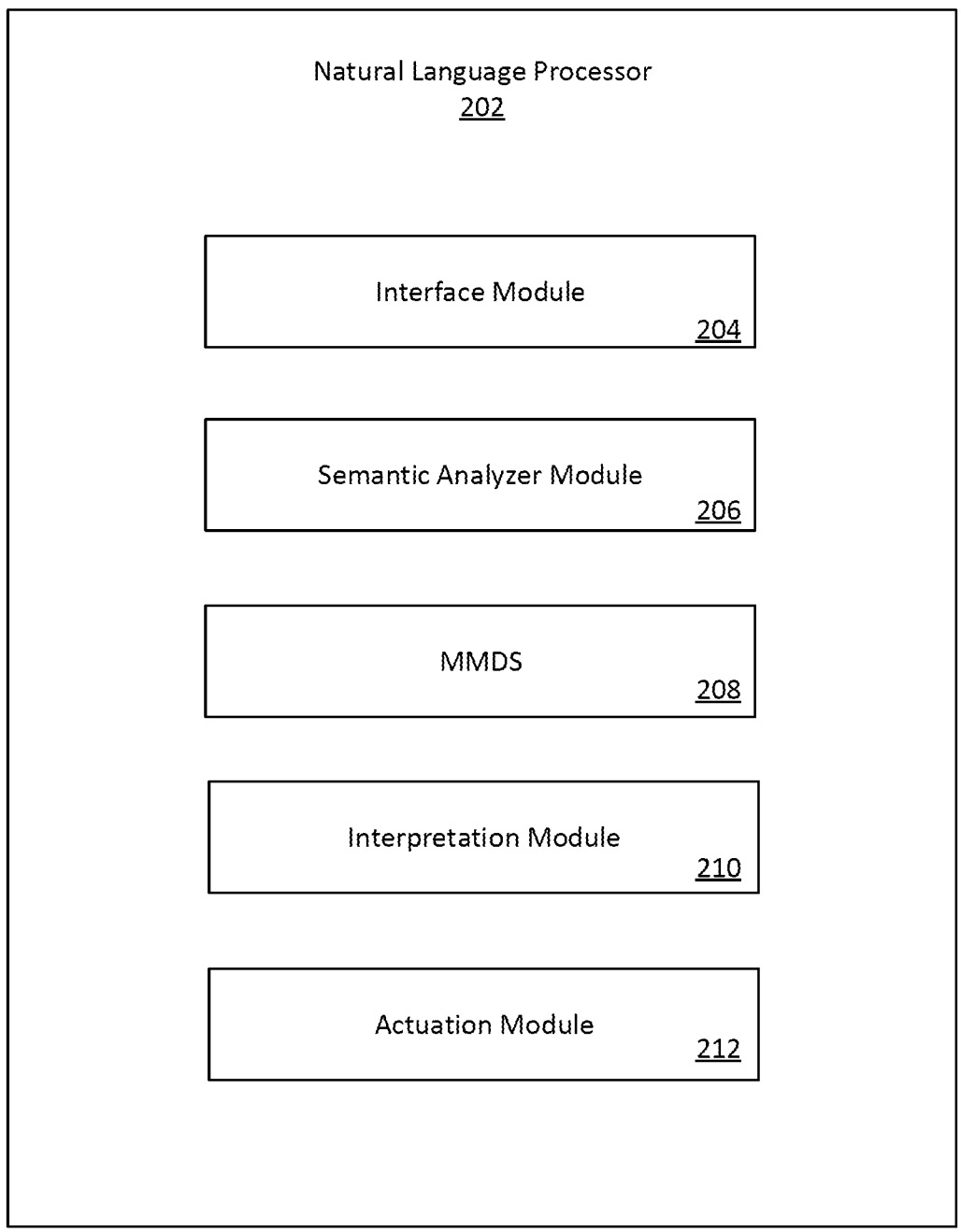
FIG. 2 is a block diagram for natural language processing of an incoming call, according to some embodiments.

FIG. 2 is a block diagram of a Natural Language Processor (NLP) system 200, according to some embodiments. The number of components in system 200 is not limited to what is shown and other variations in the number of arrangements of components are possible, consistent with some embodiments disclosed herein. The components of FIG. 2 may be implemented through hardware, software, and/or firmware. As used herein, the term non-recurrent neural networks, which includes transformer networks, refers to machine learning processes and neural network architectures designed to handle ordered sequences of data for various natural language processing (NLP) tasks. NLP tasks may include, for example, text translation, text summarization, text generation, sentence analysis and completion, determination of punctuation, or similar NLP tasks performed by computers.

As illustrated, system 200 may comprise a Natural Language Processor (NLP) 202. NLP 202 may include any device, mechanism, system, network, and/or compilation of instructions for performing natural language recognition of caller sentiment, emotions and complaints, consistent with the technology described herein. In the configuration illustrated in FIG. 2, NLP 202 may include an interface module 204, a semantic analyzer 206, a Master and Metadata Search (MMDS) module 208, an interpretation module 210, and/or an actuation module 212. In certain embodiments, modules 204, 206, 208, 210, and/or 212 may each be implemented via any combination of hardware, software, and/or firmware.

Interface module 204 may serve as an entry point or user interface through which one or more utterances, such as spoken words/sentences (speech), may be entered for subsequent recognition using an automatic speech recognition model. While described for spoken words throughout the application, text may also be analyzed and processed using the technology described herein. For example, a pop-up chat session may be substituted for spoken words. In another embodiment, text from emails may be substituted for spoken words. In yet another embodiment, spoken words converted to text or text converted to spoken words, such as for blind or deaf callers, may be substituted without departing from the scope of the technology described herein.

In certain embodiments, interface module 204 may facilitate information exchange among and between NLP 202 and one or more users (callers) and/or systems. Interface module 204 may be implemented by one or more software, hardware, and/or firmware components. Interface module 204 may include one or more logical components, processes, algorithms, systems, applications, and/or networks. Certain functions embodied by interface module 204 may be implemented by, for example, HTML, HTML with JavaScript, C/C++, Java, etc. Interface module 204 may include or be coupled to one or more data ports for transmitting and receiving data from one or more components coupled to NLP 202. Interface module 204 may include or be coupled to one or more user interfaces (e.g., a speaker, microphone, headset, or GUI).

In certain configurations, interface module 204 may interact with one or more applications running on one or more computer systems. Interface module 204 may, for example, embed functionality associated with components of NLP 202 into applications running on a computer system. In one example, interface module 204 may embed NLP 202 functionality into a Web browser or interactive menu application with which a user (call agent) interacts. For instance, interface module 204 may embed GUI elements (e.g., dialog boxes, input fields, textual messages, etc.) associated with NLP 202 functionality in an application with which a user interacts. Details of applications with which interface module 204 may interact are discussed in connection with FIGS. 1 and 3-10.

In certain embodiments, interface module 204 may include, be coupled to, and/or integrate one or more systems and/or applications, such as speech recognition facilities and Text-To-Speech (TTS) engines. Further, interface module 204 may serve as an entry point to one or more voice portals. Such a voice portal may include software and hardware for receiving and processing instructions from a user via voice. The voice portal may include, for example, a voice recognition function and an associated application server. The voice recognition function may receive and interpret dictation, or recognize spoken commands. The application server may take, for example, the output from the voice recognition function, convert it to a format suitable for other systems, and forward the information to those systems.

Consistent with embodiments of the present invention, interface module 204 may receive natural language queries (e.g., word, phrases or sentences) from a caller and forward the queries to semantic analyzer 206.

Semantic analyzer 206 may transform natural language queries into semantic tokens. Semantic tokens may include additional information, such as language identifiers, to help provide context or resolve meaning. Semantic analyzer 206 may be implemented by one or more software, hardware, and/or firmware components. Semantic analyzer 204 may include one or more logical components, processes, algorithms, systems, applications, and/or networks. Semantic analyzer 206 may include stemming logic, combinatorial intelligence, and/or logic for combining different tokenizers for different languages. In one configuration, semantic analyzer 206 may receive an ASCII string and output a list of words. Semantic analyzer 206 may transmit generated tokens to MMDS module 208 via standard machine-readable formats, such as the eXtensible Markup Language (XML).

MMDS module 208 may be configured to retrieve information using tokens received from semantic analyzer 206. MMDS module 208 may be implemented by one or more software, hardware, and/or firmware components. MMDS module 208 may include one or more logical components, processes, algorithms, systems, applications, and/or networks. In one configuration, MMDS module 208 may include an API, a searching framework, one or more applications, and one or more search engines.

MMDS module 208 may include an API, which facilitates requests to one or more operating systems and/or applications included in or coupled to MMDS module 208. For example, the API may facilitate interaction between MMDS 208 and one or more structured data archives (e.g., knowledge base).

In certain embodiments, MMDS module 208 may be configured to maintain a searchable data index, including metadata, master data, metadata descriptions, and/or system element descriptions. For example, the data index may include readable field names (e.g., textual) for metadata (e.g., table names and column headers), master data (e.g., individual field values), and metadata descriptions. The data index may be implemented via one or more hardware, software, and/or firmware components. In one implementation, a searching framework within MMDS 208 may initialize the data index, perform delta indexing, collect metadata, collect master data, and administer indexing. Such a searching framework may be included in one or more business intelligence applications (e.g., helpdesk, chatbots, voice interactive modules, etc.)

In certain configurations, MMDS module 208 may include or be coupled to a low level semantic analyzer, which may be embodied by one or more software, hardware, and/or firmware components. The semantic analyzer may include components for receiving tokens from semantic analyzer 206 and identifying relevant synonyms, hypernyms, etc. In one embodiment, the semantic analyzer may include and/or be coupled to a table of synonyms, hypernyms, etc. The semantic analyzer may include components for adding such synonyms as supplements to the tokens.

Consistent with embodiments of the present invention, MMDS module 208 may leverage various components and searching techniques/algorithms to search the data index using tokens received by semantic analyzer 206. MMDS module 208 may leverage one or more search engines that employ partial/fuzzy matching processes and/or one or more Boolean, federated, or attribute searching components. By way of non-limiting examples, similar customers, similar calls (e.g., similar complaints) or positive/negative call outcomes may be discovered using the various described searching components. Although, one skilled in the art will appreciate other approaches to identify these similar elements may be used or contemplated within the scope of the technology described herein.

In certain configurations, MMDS module 208 may include and/or leverage one or more information validation processes. In one configuration, MMDS module 208 may leverage one or more languages for validating XML information. MMDS module 208 may include or be coupled to one or more clients that include business application subsystems.

In certain configurations, MMDS module 208 may include one or more software, hardware, and/or firmware components for prioritizing information found in the data index with respect to the semantic tokens. In one example, such components may generate match scores, which represent a qualitative and/or quantitative weight or bias indicating the strength/correlation of the association between elements in the data index and the semantic tokens.

Figure 3:
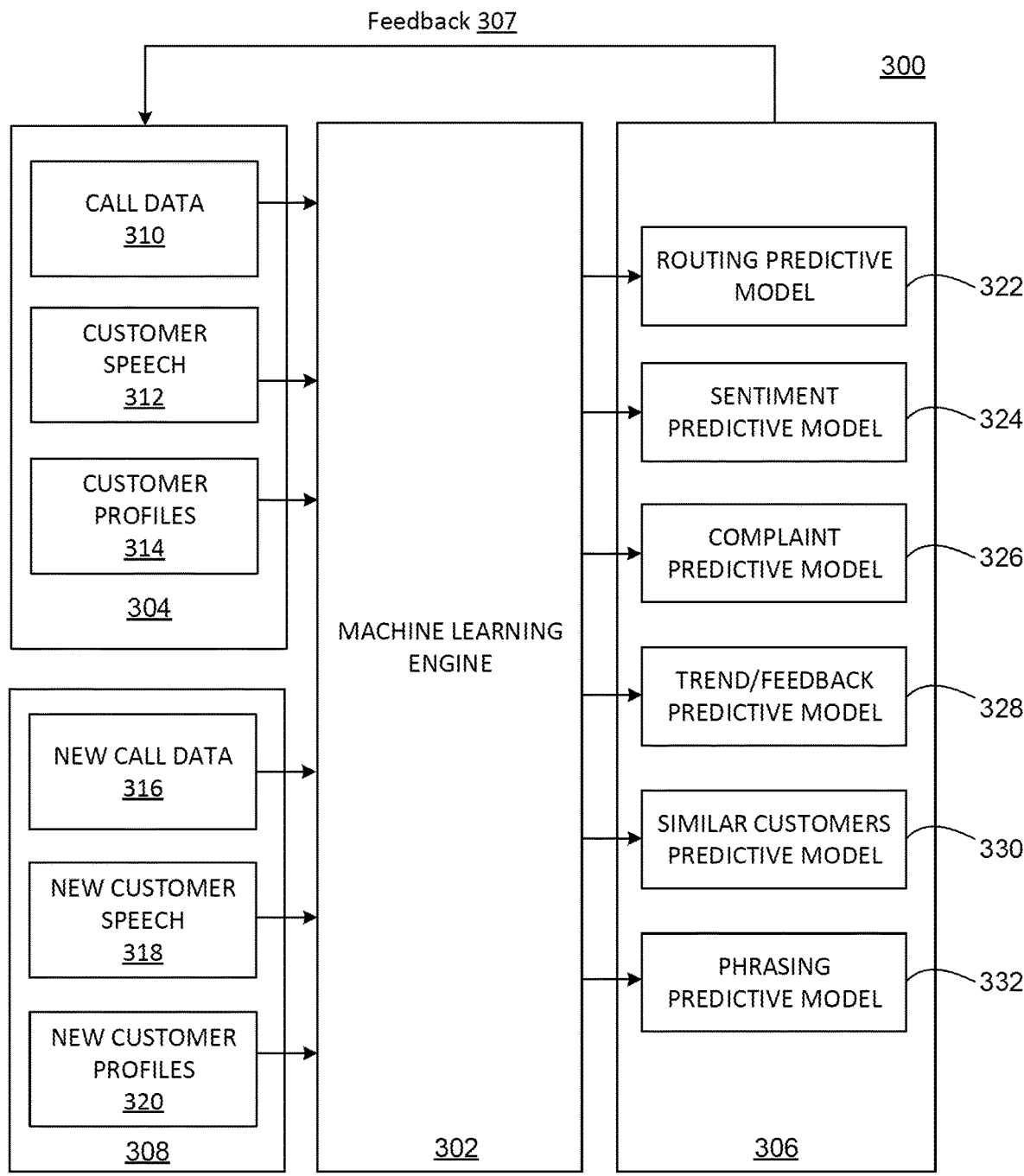
FIG. 3 is a block diagram for processing an incoming call with machine learning, according to some embodiments.

In one configuration, MMDS module 208 may include one or more machine learning components to enhance searching efficacy as discussed further in association with FIG. 3. In one example, such a learning component may observe and/or log information requested by callers and may build additional and/or prioritized indexes for fast access to frequently requested data. Learning components may exclude frequently requested information from the data index, and such MMDS data may be forwarded to and/or included in interpretation module 210.

MMDS module 208 may output to interpretation module 210 a series of meta and/or master data technical addresses, associated field names, and any associated description fields. MMDS module 208 may also output matching scores to interpretation module 210.

Interpretation module 210 may process and analyze results returned by MMDS module 208. Interpretation module 210 may be implemented by one or more software, hardware, and/or firmware components. Interpretation module 204 may include one or more logical components, processes, algorithms, systems, applications, and/or networks. In one example, interpretation module 204 may include an agent network, in which agents make claims by matching policy conditions against tokenized natural language queries and context information.

Consistent with embodiments of the present invention, interpretation module 210 may be configured to recognize information identified by MMDS 208. For example, interpretation module 210 may identify ambiguities, input deficiencies, imperfect conceptual matches, and compound commands. In certain configurations, interpretation module 210 may initiate, configure, and manage user dialogs; specify and manage configurable policies; perform context awareness processes; maintain context information; personalize policies and perform context switches; and perform learning processes.

Interpretation module 210 may provide one or more winning combinations of data elements to actuation module 212. Interpretation module 210 may filter information identified by MMDS module 210 in order to extract information that is actually relevant to spoken inputs. That is, interpretation module 210 may distill information identified by MMDS module 208 down to information that is relevant to the words/sentences and in accordance with intent. Information provided by interpretation module 210 (i.e., winning combination of elements) may include function calls, metadata, and/or master data. In certain embodiments, the winning combination of elements may be arranged in specific sequence to ensure proper actuation. Further, appropriate relationships and dependencies among and between various elements of the winning combinations may be preserved/maintained. For example, meta and master data elements included in a winning combination may be used to populate one or more function calls included in that winning combination.

Actuation module 212 may process interpreted information provided by interpretation module 210. Actuation module 212 may be implemented by one or more software, hardware, and/or firmware components. Actuation module 212 may include one or more logical components, processes, algorithms, systems, applications, and/or networks. Actuation module 212 may be configurable to interact with one or more system environments.

Figure 4:
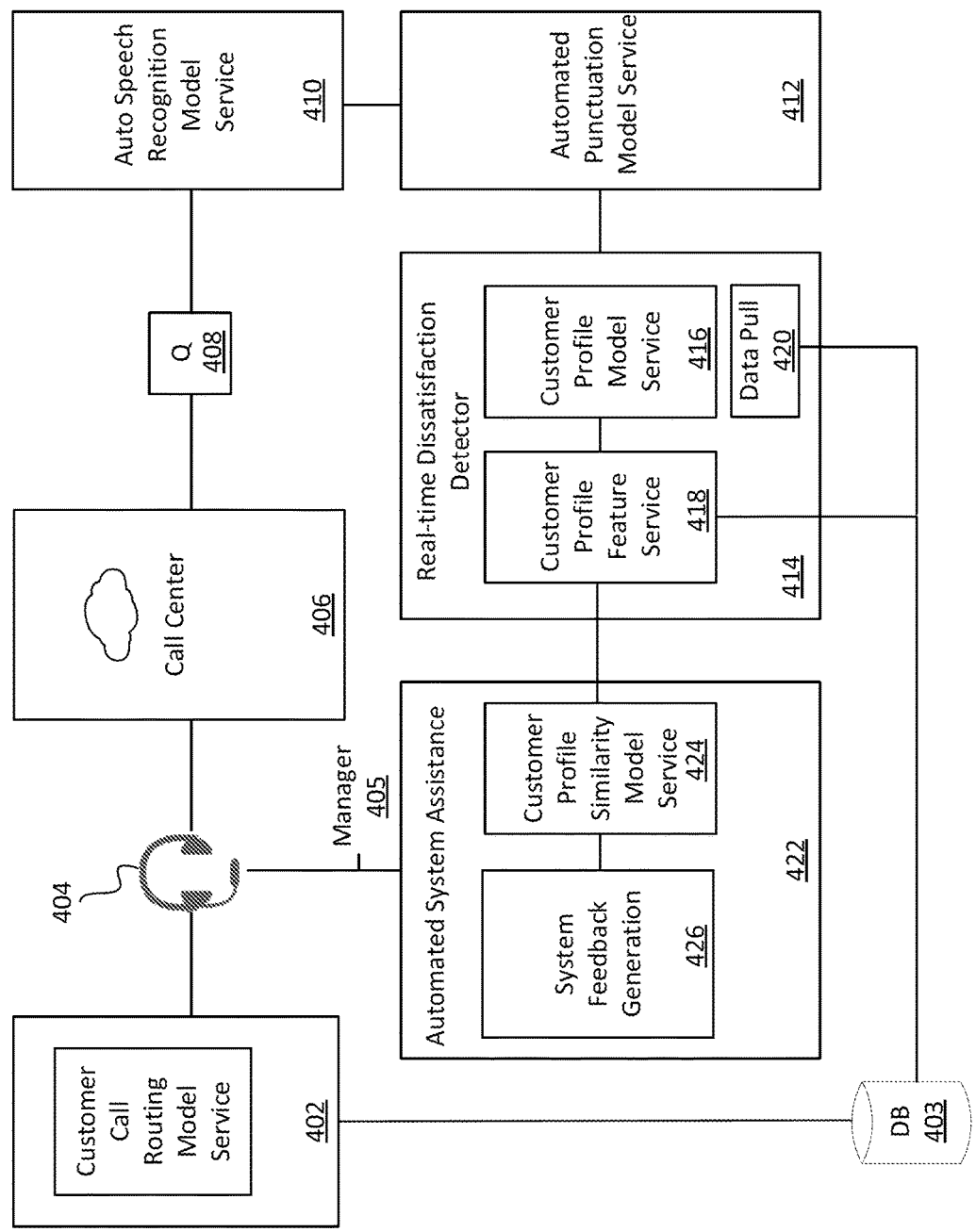
FIG. 4 is a block diagram for real-time call dissatisfaction detection and assistance, according to some embodiments.

Consistent with embodiments of the present invention, actuation module 212 may be configured to provide information to one or more users/systems (e.g., Automated Punctuation Model Service 412 as shown in FIG. 4). In such embodiments, actuation module may interact with one or more information display devices.

In certain embodiments, actuation module 212 may be configured to send requests to one or more devices and/or systems using, for example, various APIs. Actuation module 212 may generate one or more presentations based on responses to such commands.

For clarity of explanation, interface module 204, semantic analyzer 206, MMDS module 208, interpretation module 210, and actuation module 212 are described as discrete functional elements within NLP 202. However, it should be understood that the functionality of these elements and modules may overlap and/or may exist in fewer elements and modules. Moreover, all or part of the functionality of these elements may co-exist or be distributed among several geographically-dispersed locations.

FIG. 3 is a block diagram of a machine learning system, according to some embodiments. A machine learning system 300 may include a machine learning engine 302 of one or more servers (cloud or local) processing audio text (speech), such as words, phrases or sentences, to recognize relationships of words (e.g., within sentences) received by natural language system 200. As described in various embodiments, machine learning engine 302 may be used to route incoming calls, recognize sentiment within a customer's speech, recognize complaints, recognize trends, determine similar customers, and provide relevant phrasing to provide real-time assistance to a call agent. While described in stages, the sequence may include more or less stages or be performed in a different order.

Machine learning involves computers discovering how they can perform tasks without being explicitly programmed to do so. Machine learning (ML) includes, but is not limited to, artificial intelligence, deep learning, fuzzy learning, supervised learning, unsupervised learning, etc. Machine learning algorithms build a model based on sample data, known as "training data", in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning). Machine learning engine 302 may use various classifiers to map concepts associated with a specific language structure to capture relationships between concepts and words/phrases/sentences. The classifier (discriminator) is trained to distinguish (recognize) variations. Different variations may be classified to ensure no collapse of the classifier and so that variations can be distinguished.

Machine learning may involve computers learning from data provided so that they carry out certain tasks. For more advanced tasks, it can be challenging for a human to manually create the needed algorithms. This may be especially true of teaching approaches to correctly identify speech patterns and associated emotions within varying speech structures. The discipline of machine learning therefore employs various approaches to teach computers to accomplish tasks where no fully satisfactory algorithm is available. In cases where vast numbers of potential answers exist, one approach, supervised learning, is to label some of the correct answers as valid. This may then be used as training data for the computer to improve the algorithm(s) it uses to determine correct answers. For example, to train a system for the task of word recognition, a dataset of audio/word matches may be used.

In a first stage, training data set 304 (in this case call data 310, customer speech data 312, customer profiles 314, etc.) may be ingested to train various predictive models 306. In a first case example, a routing predictive model 322 may be trained based on machine learning engine 302 processing training data set 304. Training a model means learning (determining) values for weights as well as inherent bias from labeled examples. In supervised learning, a machine learning algorithm builds a model by examining many examples and attempting to find a model that minimizes loss; this process is called empirical risk minimization. A language model assigns a probability of a next word in a sequence of words. A conditional language model is a generalization of this idea: it assigns probabilities to a sequence of words given some conditioning context. In this case, the routing predictive model recognizes previous customers, customer areas of interest (credit card assistance, etc.) to infer (predict) a relevant call agent (or call agent group tasked with working with a specific category (e.g., credit card issues)). An incoming call is subsequently routed to a call agent.

In a second stage, the training cycle continuously looks at results, measures accuracy and fine-tunes the inputs to the modeling engine (feedback loop 307) to improve capabilities of the various predictive models 306.

In addition, as various predictive models (algorithms) 306 are created, they are stored in a database (not shown). For example, as the training sets are processed through the machine learning engine 302, the routing predictive model 322 may change (tuning/fine tuning) and therefore may be recorded in the database.

Future new data 308 (e.g., new call data 316, new customer speech 318 or customer profiles 320) may be subsequently evaluated with the trained predictive models 306.

Sentiment predictive model 324 may detect when a customer is becoming angry or dissatisfied. Acoustic features in accordance with aspect-based sentiment analysis is a more targeted approach to sentiment analysis identifying both emotion and their objects (products, services, etc.). This is particularly useful for customer calls as it helps agents identify which items need improvement to achieve higher customer satisfaction. The system performs aspect-based sentiment classification on a turn level (i.e., every time a new utterance is available). Performing this in real-time enables the system to track how sentiment changes over the course of a call. The interaction below is an example where the sentiment against a certain aspect changes.

[Agent] I would be happy to help you with viewing your payment history.
[Customer] Awesome. I hope I can get the app to work.
Aspect: app
Sentiment: positive
[Agent] Once in the account summary page, please click on the account history to view previous transactions.
[Customer] This is useless. There is no way that this app can go back 6 months and show all the history at the same time.
Aspect: app
Sentiment: negative As can be seen in the interaction above, the sentiment against the app has changed over the course of the call. The sentiment predictive model's turn level analysis may also capture that the agent's instructions did not resolve the customer's issue.

This module is to not only capture sentiments for specific aspects, but also to understand a customers' emotions throughout a call. To that end, sentiments are not limited, for example, to a specific number of positive/negative sentiments: a range of emotions that affect customer satisfaction considered during classification. The example below shows a change of emotions during a call.

[Customer] I have been trying to make a payment for over an hour now and it's still stuck!
Sentiment: angry
[Agent] I apologize for the inconvenience. I will be happy to assist you with your payment.
[Customer] Oh good. Finally, I'm talking to someone who can help.
Sentiment: hopeful
[Customer] Ah, I see. There it is. That payment button seemed to be hiding on my phone screen. Now that I found it, it'll be easier.
Sentiment: happy The customer dissatisfaction module 110 may also include a sentiment analysis module. The sentiment analysis module is a classifier that may take in utterance text and provides an output label indicating an utterance's sentiment and aspect. In this context, aspect refers to the service/product that the customer shows emotion toward. For example, customers might be generally happy about being a customer of a bank, but they might complain about their interest rates. In this case, the aspect would be toward interest rates (e.g., the service/product the customer is referring to) and the sentiment would be negative. One goal may be to detect when conversation is headed in a direction containing disappointment, dissatisfaction, or a complaint (FIG. 7). In this case, the model may trigger the Automated System Assistance module 114 for real-time support.

By way of a non-limiting example, customer dissatisfaction may be determined by one of two ways—the detected emotion belongs to a negative category (e.g., angry) and the call's emotions have a downward trajectory (i.e., initial emotions were positive and subsequent emotions are intermediate).

A complaint predictive model 326 predicts whether a historical call contains a complaint (e.g., tier 1) and can leverage this model on individual customer utterances. For a first task, machine learning engine 302 may use the current tier 1 complaints model on the dialogue history and current utterance to predict whether the call up to the current time contains a complaint. If the complaint score returned by the model exceeds a predetermined threshold, an automated agent assistance module 114 may be triggered to assist the agent in handling the complaint.

For a second task, the system may train a trend/feedback predictive model 328 that may predict whether a complaint is likely in the upcoming utterances. In one non-limiting example, supervised training data may include calls that include known complaints. For model training, the system may use the current complaint predictive model 326 to score every utterance of a transcript (sentiment score). The information may include utterances with low sentiment scores that come right before utterances with high sentiment scores. Those utterances are positive examples. Once the model is trained, the system may preemptively warn the agent that the customer may or is about to complain based on recognizing trends in sentiment scores (trend/feedback). Combining this capability with a similar customer predictive model 330 (described in greater detail hereafter), based on a call reason classification, will allow the system to provide fine-grained assistance to the agent. In some embodiments, complaint recognition is framed as a binary classification task (e.g., complaint/no complaint).

Complaint predictive model 326 may also extract the customer's various reasons for calling as these reasons develop throughout the call. For each customer or agent utterance, the system may pass a call reason classifier over the utterance and update the customer profile with this information. In one non-limiting example, this model may be a L1 penalized Logistic Regression classifier, trained to identify, for example, one of many classes of call reasons in a snippet of call text. These call reasons range from topics (e.g., as shown in the below call record—balance transfers, hardship-based policies and procedures (hardship) and dispute times). An example of call text and the call reason identified in this text is given below.

> balance_transfer_api—"I was wondering if there was a fee or, like, an interest charge if I transfer my balance from my first credit card to my second credit card"
>
> hardship—"Yes my husband isn't working right now. His work was closed—it's a restaurant—his work was closed because of the coronavirus. I'm wondering if I may get a break on the amount that I pay each month until he finds another job."
>
> disputes_time_to_resolve—"I called in a while ago about a charge that I didn't make and the person, the agent told me I may call to see when the charge would be taken off my card.

The system may use predicted sentiment scores over time to track satisfaction trends and determine the part of the call in which the dissatisfaction was resolved. As the call is happening (i.e., in real time), a complaint is detected on the current utterance. Subsequent utterances may also be labeled as complaints. As the call continues, utterances may begin to have higher sentiment scores (happier) compared to previous utterances and thus not be labeled as a complaint, indicating that the complaint may have been resolved. In the example below, the trend/feedback predictive model 328 detects a complaint during the first three utterances. The model classifies the fourth utterances as a non-complaint. Since the subsequent utterances are also non-complaints, the system may capture the first few non-complaint utterances immediately after the complaint utterances as the resolution. In one non-limiting example, the system may recognize multiple tiers of complaints (e.g., Tier 1 and Tier 2). A Tier 1 complaint may be handled at the agent level whereas a Tier 2 complaint may require an escalation to the front-line manager. One example trends analysis is shown below.

> [Customer] I can't believe I have this late fee.
> Tier 1 inquiry—0.7
> [Agent] I apologize and I will take a look at this issue for you.
> Tier 1 inquiry—0.6
> [Customer] I always pay on time. It's ridiculous that I'm charged a fee when I'm one day late.
> Tier 1 inquiry—0.85
> [Agent] I have good news. We are able to remove the late fee for you.
> Non Tier 1—0.2
> [Customer] Thank you, I appreciate that. Non Tier 1—0.05
> [Agent] No problem, thanks for being a loyal customer. Non Tier 1—0.06

Combined into the customer's customer profile with other data points such as sentiment, emotion, and trend/feedback score, call reasons are used to link customers to other customers with similar call reasons and the requisite workflow associated with those customers is recommended to the agent.

In one example embodiment, a training set includes a large set of N previous user interactions (call data 310, customer speech 312 and customer profiles 314). Machine learning engine 302 processes this training set to recognize call agent interactions with similar customers (similar customer module 112) that previously resulted in successful outcomes based on specific call agent phrasing and associated subsequent actions/options selected. Once the similar customers predictive model 330 has been trained to recognize patterns of behavior that resulted in successful behavior, it may take as an input any future behavior and correlate to determine a higher likelihood of successful outcome. For example, the model may provide real-time similar phrasing/actions/options classified by phrasing predictive model 332 as suggestions to assist to call agents while they are in a current call session. Phrasing model 332 may, in one non-limiting example embodiment, use a deep learning approach to auto-generate text called seq2seq ("sequence to sequence") using as training data segments of transcripts in which a customer problem has been identified and includes corresponding agent responses to the articulated problem. seq2seq models are trained on input/output pairs of sequences. In this specific example, the input sequence is the problem statement ("Your late-payment fees are exorbitant", etc.) and the output sequence is the agent's articulated response to the problem statement ("I understand your frustration with our late payment process", etc.). A seq2seq model may be trained on several hundred thousand such problem statement/agent response pairs, culled from past interactions. seq2seq may be used for any task that involves learning to produce a sequence of tokens given some input sequence of tokens. For example, a machine translation task where an input is French sentences and an output is English sentences. In another example, the training data may include question/answer pairs for conversational AI (e.g., input is question and output is answer).

The system is a framework that unites several modules to better understand customers and help call center agents converse with customers to achieve higher customer satisfaction. The system detects when customers become or are soon to be frustrated and provides support to agents in real time to improve the customer experience. An example system architecture embodiment is illustrated in FIG. 4.

FIG. 4 illustrates a call center architecture 400 (call center system), as per some embodiments. The modules described may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 400 or installed as a removable portion of the system 400.

Customer Call Routing Model Service (call routing predictive model) 402 provides machine learning call routing to a call agent 404 of call center 406. Currently, most call routing is performed through an Interactive Voice Response system (IVR). The IVR is an automated phone system with call routing capabilities that allows customers to interact with a virtual assistant before speaking with an agent. The virtual assistant is essentially a prerecorded voice menu that can be navigated verbally or manually and collects information about the customer inquiry before automatically transferring the call to the most appropriate queue.

In some embodiments, the technology described herein may use historical data to train a machine learning model (call routing predictive model 322) to automatically route calls. A database containing customer interactions with products and services helps determine where to route a customer's call based on their recent activity. This can include recent activity in an app, card transactions, searches on a website, etc. To predict which queue to route a customer call to, the system identifies all possible queues and the call reasons each addresses. Having identified the queues' common call reasons, the system frames this as a classification problem. Training labels from instances when a customer's issue may be resolved by using an original queue they were routed to and when a customer was transferred between agent queues 408. This training data may be sourced, for example, from a current IVR database, which routes customers based on the reason they provide the system for calling in. If a customer does not have a history with the call center, this too is valuable information to route their call, as new customers are likely to have similar needs. There are specific actions that a new customer may be expected to do for the first time and the system may directly check which of those actions have and have not been done. Some examples are provided below:
1. Activating a new card
2. Making a first payment
3. Setting up Autopay to automatically make monthly payments
4. Inquiring about a fee that appeared for the first time (late fee, interest charges, annual fees).

Call centers receive hundreds of thousands of calls daily. These calls may be transcribed from speech recordings to text using an automatic speech recognition (ASR) system (auto speech recognition model service 410). The ASR system's output is a sequence of words that begin when the caller begins speaking and ends only once there is a significant duration of silence or the call ends. This text may therefore contain many sentences with no visible boundaries between them and no punctuation. Additionally, given the spontaneous nature of spoken language, the text frequently contains disfluencies, for example, filler words, false starts, incomplete phrases, and other hallmarks of unrehearsed speech. These disfluencies are not marked, and are interleaved with the rest of the speech. This further obscures the meaningful portions of the text. The lack of punctuation and boundaries in the ASR system's output causes difficulty for humans or computers analyzing, reading, or processing the text output, and causes problems for downstream models, which benefit from clearly delineated syntactic boundaries in the text. Thus, a need remains for a system and method for automatically punctuating output text of ASR systems to make the text better understandable to a reader or machine.

The ASR Model Service 410 converts call audio to text for the downstream analyses described in the following sections. The ASR model is trained on, for example, hundreds of hours of call recordings with manual transcriptions, and may be implemented with actively developed open source speech recognition toolkits. The features to the model may include Mel-frequency cepstrum coefficients (MFCCs), which represent the energy present at various frequency ranges, with ranges chosen to mimic human auditory response. The underlying model methodology leverages a combination of GMMHMM (Gaussian mixture modeling and hidden Markov modeling), Ngram language modeling, and deep neural networks (DNN). The model may achieve a word error rate (WER) of ~15.0%. This is equivalent to inter-transcriber discrepancy by a professional transcriber and thus represents a natural limit for the system (given that labels are produced by these various transcribers). However, lower error rates may be achieved by continuous training and fine-tuning of the model.

Automated Punctuation Model Service 412 automatically punctuates text (speech) using a non-recurrent neural network in an embodiment of the present disclosure. As used herein, the term non-recurrent neural networks, which includes transformer networks, refers to machine learning processes and neural network architectures designed to handle ordered sequences of data for various natural language processing (NLP) tasks. The NLP tasks may include, for example, text translation, text summarization, text generation, sentence analysis and completion, determination of punctuation, or similar NLP tasks performed by computers. Further, non-recurrent neural networks do not require sequences of data to be processed in order. For example, if a sequence of data is a sequence of words of a natural language that form one or more sentences and that are to be processed by the non-recurrent neural network, the non-recurrent neural network does not need to process the words at the beginning of the sentence before it processes the words at the end of the sentence. This property allows for parallel processing of the data, resulting in faster processing times overall. Examples of non-recurrent neural networks include the Bidirectional Encoder Representations from Transformers (BERT) language model developed by Google™ and the Robustly-Optimized Bidirectional Encoder Representations from Transformers approach (RoBERTa) language model developed by Facebook™, as examples. In one embodiment, the automated punctuation service may be modeled based on BERT, RoBERTa, or similar language models.

Continuing with the example, in one embodiment, assuming that the input into the system 400 is a customer's speech to be punctuated, the system 400 may begin performing its functions by applying the text string to obtain a representation of the meaning of each word in the context of the speech string.

The text string refers to a sequence of words that are unstructured (i.e., may not be in sentence form and contain no punctuation marks). In one embodiment, the text string may be generated based on an automatic speech recognition (ASR) system 410 transcribing speech recordings to text. Based on the transcription and the spontaneous nature of spoken language, the text string likely contains errors or is incomplete. The errors may include, for example, incorrect words, filler words, false starts to words, incomplete phrases, muted or indistinguishable words, or a combination thereof, that make the text string unreadable or difficult to understand by a human or computer.

In one embodiment, the text string may be received directly from the ASR system 410. In another embodiment, the text string may be received from a repository, database, or computer file that contains the text string. For example, in one embodiment, the text string may be generated by the ASR system 410 and saved to a repository, database, or computer file, such as a .txt file or Microsoft Word™ file, as examples, for retrieval and receipt by automated punctuation model service 412. In either case (ASR vs file), the punctuation model takes an ASR output.

In one embodiment, once the text string is received, the text string may be converted from text or character format into a numerical format by the system 400. In one embodiment, the conversion may be performed by converting each word of the text string into one or more tokens (see semantic analyzer 206). The one or more tokens refer to a sequence of real values that represent and map to each word of the text string. The one or more tokens allow each word of the text string to be numerically quantified so that computations may be performed on them, with the ultimate goal being to generate one or more contextualized vectors. The contextualized vectors refer to vectors that encode the contextualized meaning (i.e., contextualized word embeddings) of each of the tokens into a vector representation. The contextualized vectors are generated through the processes and methods used in language models such as the BERT and RoBERTa language models, which are known in the art. For the purposes of discussion throughout this application it is assumed that the contextualized vectors are generated based on such processes and methods.

Continuing with the example, the one or more tokens may be generated based on a variety of criteria or schemes that may be used to convert characters or text to numerical values. For example, in one embodiment, each word of a text string can be mapped to a vector of real values. The word may then be converted to one or more tokens based on a mapping of the word via a tokenization process. Tokenization processes are known in the art and will not be further discussed in detail here.

Automated Punctuation Model Service 412 may determine what punctuation marks should exist for each word of the text string by generating a set of probability values indicating a likelihood that a punctuation mark exists for each word of the text string. The set of probability values refers to values that represent predictions as to which punctuation mark the model predicts applies to each word of the text string. The punctuation mark refers to punctuation marks such as a period, a comma, a question mark, or no punctuation, as examples. These are merely exemplary; the automated punctuation model may be trained to consider other punctuation marks. Moreover, the punctuation mark is not limited to the four punctuation marks, as this is merely for ease of description and clarity. More or less punctuation marks may be considered.

As a result, a set of vectors representing the set of probability values may be generated indicating the likelihood that each word in the text string should be followed by the punctuation mark. By way of example, in one embodiment, for the text string "the boy jumped over the puddle," the set of probability values may be generated for each of the second set of vectors indicating whether a punctuation mark exists after each of the words "the", "boy", "jumped", "over", "the", and "puddle". In one embodiment, the set of probability values may indicate that the probability of a period, comma, and question mark is 1 percent, for each of the words "the", "boy", "jumped", "over", and "the" while the probability of no punctuation is 97 percent. The set of probability values may further indicate that the probability of a comma, question mark, and no punctuation is 1 percent for the word "puddle" while the probability of a period is 97 percent if "puddle" is the last word in the text string. Alternatively, if "puddle" is followed by other words, the probability of a period may be 49 percent and the probability for a comma may be 49 percent depending on the words that follow. The aforementioned is merely exemplary. The numerical values are presented to indicate a possible operation of the system 400 and are not meant to be limiting.

In one embodiment, the formatted text string may further be transmitted for display or may be transmitted to a repository, database, or computer file, such as a .txt file or Microsoft Word™ file, as examples, to be saved for further retrieval by a user or components of the system 100.

In one embodiment, once the model is trained, the aforementioned processes may be performed by successively repeating the processes for one or more text strings of a larger text string, where the one or more text strings contain one or more overlapping windows of text. By performing these processes on overlapping windows of text, the automated punctuation model service 412 can more accurately determine the punctuation mark for each word in a text string, because the overlapping windows of text allows the automated punctuation model service 412 to determine the context for each word of the text string by looking at the words before and after the word in relation to multiple combinations of words in the text string such that the model service 412 can better determine how the word is used in the text string.

It has been determined that successively repeating the processes for one or more text strings in this manner generates greater accuracy in predicting the punctuation mark for each of the words of the text string because it allows the automated punctuation model service 412 to obtain greater context for each word, and allows a view each word of the text string in multiple contexts.

Real-time automatic punctuation has several benefits for system 400. Firstly, alerts sent to managers 405 or automated assistance sent to call agents 404 may include relevant transcript snippets to provide context of when something went wrong (e.g., the customer became irate). These snippets are much more readable when properly punctuated. Humans comprehend written language better and faster when punctuated. This quick and thorough comprehension is especially important given the time-sensitive nature of feedback on a live customer call. Secondly, automatic punctuation can benefit the downstream models used to detect customer sentiment. Punctuation can be a signal for when a batch of input is ready to be fed into downstream models. While the granularity of individual words is likely too fine to be useful as model input, when to consider a batch of words ready for model input is not a trivial task. While a simple count of words (e.g., input 30 words at a time) or acoustic metrics (e.g., input 5 seconds of words at a time) are possible, they lack the desired quality of linguistic cohesion (i.e., they cannot ensure model inputs are full sentences). Real-time automatic punctuation offers a solution to this problem by providing boundary markers between cohesive semantic propositions (i.e., sentence-final punctuation). This is important because models can perform significantly better when given full sentences. Performance can be further improved when punctuation is included, as it helps demarcate syntactic boundaries (e.g. commas denoting clausal boundaries).

The automated punctuation model may be a network machine learning model (e.g., deep neural) that performs multi-class classification over possible punctuation marks between words in unpunctuated text. The network uses a deep fully connected bi-directional transformer-based pre-trained neural network language model (LM) as the core of the automatic text punctuation network. The network adds several additional layers after the pre-trained LM network with each layer preserving the fully connected nature of the entire network. Each additional layer is trained from scratch before fine-tuning parameters of the entire network. The prediction of what punctuation to place after each word (including choosing no punctuation) is performed in parallel during both training and inference, which is a departure from most previous approaches for the punctuation task. Although prediction is performed in parallel, the system replicates the data to see the same number of inputs during training as a sequential prediction network. Furthermore, at inference time the model aggregates predictions across multiple context windows allowing greater context to be used in predicting a word's punctuation and providing robustness through an ensemble of multiple predictions.

Real-time Customer Dissatisfaction Detector 414 provides complaint detection. The complaints detection module may perform the following tasks: 1. given a dialogue history and most recent customer utterance, predict whether the call contains a complaint. 2. given the dialogue history, predict the likelihood of a complaint in upcoming utterances.

After collecting data points regarding the customer and call as previously described above, such as the customer's emotional state and their reason for calling, the system aggregates this information into, for example, a single unit of analysis, to generate a customer profile. The customer profile contains both metadata related to the customer, collected in an offline manner, as well as information collected by the various predictive models, which is iteratively updated as the call proceeds. A customer profile contains a mix of data types, which are vectorized as part of the similar-customer search. All data types are vectorized and then concatenated to form a single fixed-length vector.

The Real-time Customer Dissatisfaction Detector 414 may include trend/feedback scoring based on a trend of accumulated sentiment scores. In one embodiment, the sentiment score may measure customers' likelihood to recommend a product or service. A transformer-based language model uses call transcripts to predict customers' answer to the following question: "Based on your recent call experience, if a family member, friend, or colleague asked you to recommend a credit card, how likely would you be to recommend [company name]?" The response is on a scale of 1-5 and delineated as follows: "promoters" respond 5, "neutral" respond 4, "detractors" respond 3 or less. One way to calculate sentiment score is by taking the percent of "promoters" and subtracting the percent of "detractors," and this particular method of calculation is also commonly named the "Net Promoter Score." The model architecture consists of an input of tokenized word indices, each represented by an embedding vector. The input, an entire call transcript, is vectorized and then transformed via layers of "self-attention" which produce a feature-rich vector representation of the transcript. This vector representation is then passed into a classification layer, which utilizes an ordinal regression algorithm to rank the output as "detractor"<"neutral"<"promoter". The rank of "promoter" represents a predicted score greater than "detractor" and "neutral" ("neutral" predicted as greater than "detractor" but less than "promoter", etc.) A predicted sentiment score is then calculated as above with these predicted labels.

A trend can be calculated in the following ways: 1. The model-predicted sentiment scores can be aggregated on a daily, weekly, or monthly basis to obtain sentiment scores over time. With this time-series, deviations can be determined by applying a trend detection algorithm measuring changes in the mean and/or slope. 2. A customer-specific trend score may be calculated by tracking sentiment scores for a customer across calls. For example, the real-time dissatisfaction detector module 414 may predict trend scores for all customer X's previous calls to obtain X's time-series. The system may monitor these trend scores to detect when a deviation occurs, such as a very negative call, or calculate the moving average to determine when a customer's experience drops below a threshold. Calls can be identified for further investigation of coaching opportunities and improvement to call center processes.

Therefore, the technology described herein solves one or more technical problems that exist in the realm of online computer systems. One problem, proper identification of a caller's sentiment, prevents other systems from properly correlating sentiment with corresponding caller solutions (based on a correctly identified sentiment). The technology as described herein provides an improvement in properly identifying a caller's sentiment and sentiment trend that increases a likelihood of a correlation with a real-time solution (e.g., in the automated system assistance module) and subsequent successful outcome of the call. Therefore, one or more solutions described herein are necessarily rooted in computer technology in order to overcome the problem specifically arising in the realm of computer networks. The technology described herein reduces or eliminates this problem of an inability for a computer to properly capture a correct sentiment understanding or sentiment trend as will be described in the various embodiments of FIGS. 1-8.

For real-time trends, the model can predict continuously as the call is transcribed. This generates a real-time trend score that updates as the call progresses. A trend may be detected when the real-time score deteriorates significantly. When a downward trend is detected, it should be remedied at that time.

For offline trend detection, an intervention may be triggered so that: 1) managers and/or stakeholders are alerted to the trend, 2) analysts are notified of specific trends for further exploration, 3) customers affected by the trend may be contacted for remediation. In the case of a real-time trend, the customer may be transferred to a manager or specialist.

Automated System Assistance 422 aims at finding customers similar to the current customer in order to drive insights into what actions resolved their complaints and what language helped increase customer satisfaction. To this end, the customer profile similarity model service 424 groups previous customers based on their similarities to the current customer and find the closest cluster of customers. Using this most similar group, the system extracts a list of previously successful actions. The system provides these actions to the System Feedback Generation module 426 to present real-time support to call agents 404 in the form of language suggestions (e.g., phrases).

To link customers by their profiles, the system relies on a family of approaches standard in product recommender systems. This involves vectorizing customer information into a common format and using vector-based similarity metrics to cluster these customers. 1. Presume a "warm start" scenario, i.e., the customer has a transaction or call history. However, if no customer information exists, as commonly occurs with new cardholders (the "cold start" problem), the system starts with basic metadata such as card-type and updates customer vectors in real-time as new information becomes available from the NLP models.

In general, customer similarity can be viewed as customers who interact with company products/services in a similar way (own the same credit cards, have similar spending habits, etc.). These features may be embedded in a vector space and with similarities computed across a customer base. Model-score-based similarity provides that, given a current call, the system may calculate previously mentioned features (e.g., sentiment score, call reason, complaint detection, etc.). Calculating these on each utterance allows the system to obtain a distribution over time. This information may be vectorized and compared with previous calls (e.g., cosine distance). The most similar calls may be provided as a reference, particularly the previous call agent's notes and actions. This can give the current agent a suggestion as to what the best next steps are.

In addition to the customer and sentiment-model-output-based information described above, the system may also incorporate ontology-based information into vectors. This involves extracting, for example, 15 phrases from transcripts and resolving these to concepts for a customer. Ontology uses an entity-linking model. For example, given the phrase "chip in my card isn't working" in Customer Profile x and the phrase "chip has scuff marks" in Customer Profile y, an entity-linking model resolves these to the concept "card_broken." This concept may then be embedded in a vector space along with other available data points.

System Feedback Generation 426 organizes system feedback in a manner accounting for alarm fatigue. Feedback should not desensitize agents or be overly invasive so they turn off alerts completely. To this end, the system may use color codes to gauge customer satisfaction and categorize system feedback. A last customer's satisfaction level (gauge) and average over a period of time Customer emotion is predicted for each utterance. This information can be summarized and provided to managers 405 for coaching and discussion to develop a better customer experience. In terms of satisfaction, two metrics will be shared with managers: customer's emotions averaged over a call: for example, a call with utterances rated 5, 5, 4, 2, 3, will produce an average score of 3.8 that gets presented to the manager and customer emotions over a long period of time (e.g., a week). For example, if the call agent interacted with four customers that week, with average emotional states 3, 4, 4, 2, then an overall value of 3.25 will be provided to the manager indicating an average.

In order to provide growth opportunities for agents, managers 405 may be provided with two sets of telemetry: sentiment scores throughout each call and emotions for each customer that interacted with a given agent last month. Telemetry will have an aggregate view similar to the following figure:

An agent's performance may be summarized using utterance-level sentiment score predictions. Similar graphs may also be generated for emotional states. Telemetry is an easy way to visualize patterns. In the example above, there is a trend for sentiment scores to go down and then up. This information may be used to coach the agent to address the factors causing the sentiment score drop.

The system measures customer satisfaction using two main metrics: sentiment score and customer emotion. Both are predicted in real-time at an utterance level. Call agents will be provided with both while talking to customers. Making it easy to absorb information so agents can focus on the call itself. To simplify information consumption, the metrics will be presented, for example, in the form of a color-coded gauge that changes throughout the call.

To help agents determine the importance of automated feedback and prevent alarm fatigue, the system provides a prioritized support system where each piece of feedback is color-coded. While it is safe to ignore green messages, the agent should take red alerts into account. The figure below shows categories of alerts that may be shown to agents while on a call. At any given time, only one category will be shown and clicking the alert will show feedback details.

Figure 5:
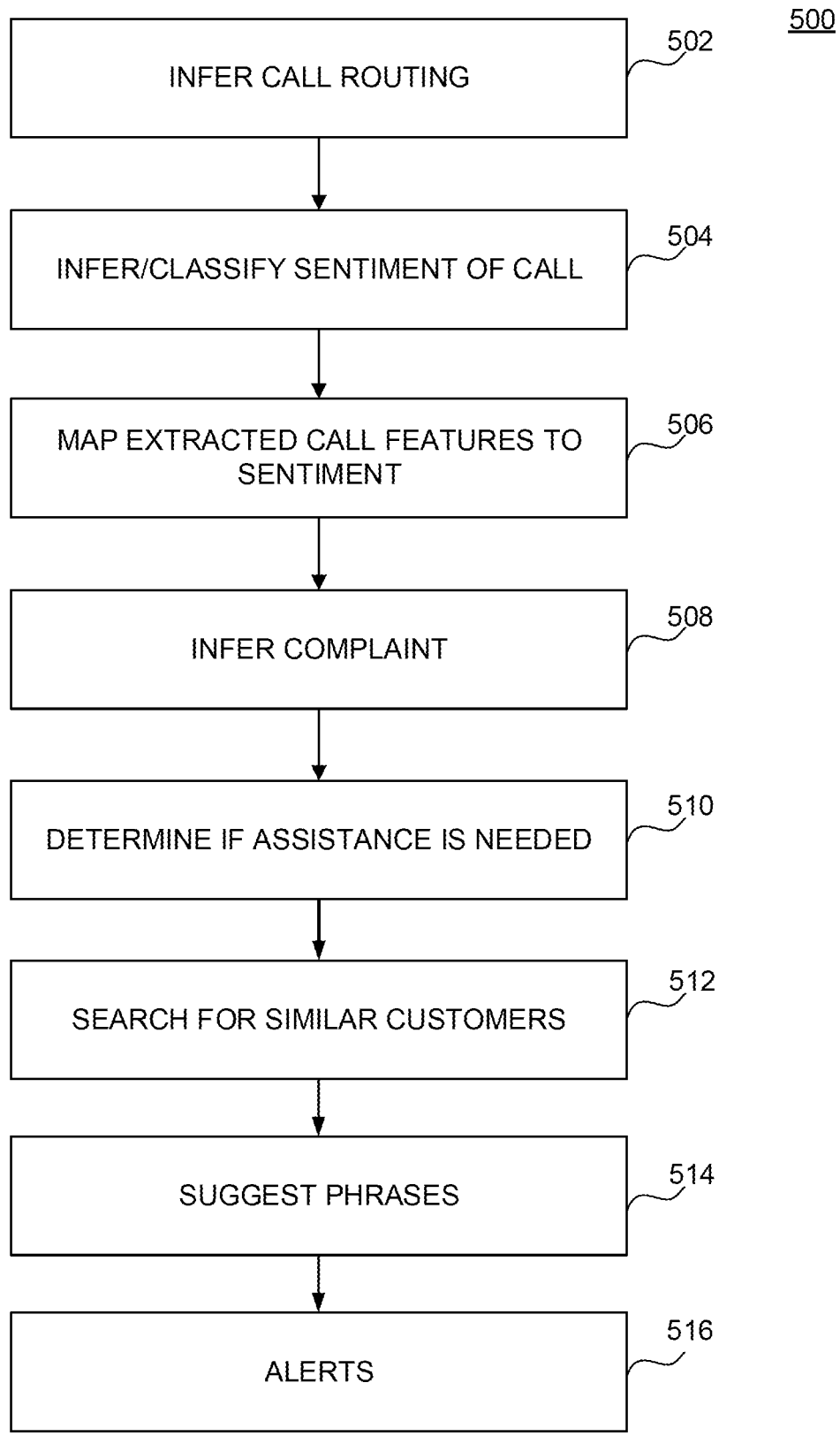
FIG. 5 is a flow diagram for real-time call processing, according to some embodiments.

FIG. 5 is a flow diagram for real-time call processing, according to some embodiments.

In 502, call center system 400 may forward incoming calls to a call agent based on inferred intelligence. Call routing may be based on an analysis of pre-call information, such as a caller's profile, previous call interactions, voice menu selections or inputs to automated voice prompts. A machine learning engine 302 trains a routing predictive model 322 to recognize previous customers, customer areas of interest (credit card assistance, etc.) to infer (predict) a relevant call agent (or call agent group tasked with working with a specific category (e.g., credit card issues)). An incoming call is subsequently routed to a call agent.

In 504, call center system 400 may infer/classify the incoming call based on detected sentiments. A machine learning engine 302 trains a sentiment predictive model 324 to detect when a customer is becoming angry or dissatisfied. Acoustic features in accordance with aspect-based sentiment analysis is a more targeted approach to sentiment analysis identifying both emotion and their objects (products, services, etc.). The system performs aspect-based sentiment classification on a turn level (i.e., every time a new utterance is available). Performing this in real-time enables the system to track how sentiment changes over the course of a call.

In 506, call center system 400 may map extracted call features to detected sentiments. For example, the machine learning engine 302 classifies a sentiment of customer speech and, if a negative sentiment is detected, identifies a negative emotion (anger, confusion, discontent, or dissatisfaction) present. The system may then extract services, features, and topics mentioned by customers and may identify one or more categories of sentiment attributed to each of these.

In 508, call center system 400, based on one or more of the sentiment, emotions and features, may infer whether a complaint is being articulated by the caller. The system may classify a detected complaint based on any of, emotions detected, subject matter detected, sound volume or intensity of the call utterances. For example, an agitated caller may raise their voice, increase the speed or intensity of their speech or use words depicting anger. The machine learning engine 302 may also train a trend/feedback predictive model 328 to predict whether a complaint is likely in the upcoming utterances. The training data will be calls that contain complaints. For model training, the system may use the current complaint predictive model 326 to score every utterance of a transcript (sentiment score). The informative information may be utterances with low sentiment scores that come right before utterances with high sentiment scores. Those utterances will be positive examples. Once the model is trained, the system may preemptively warn the agent that the customer may or is about to complain based on recognizing trends in sentiment scores (trend/feedback).

In 510, call center system 400, may determine if assistance is needed. For example, if a sentiment score exceeds a predetermined threshold, an automated agent assistance module 114 may be triggered to assist the agent in handling the complaint.

In 512, call center system 400 may search for similar customers. For detected complaints, similar customer module 112 will search for similar customers with similar issues and successful resolutions of previous complaints. Automated system assistance module 114 will subsequently analyze these successful resolutions to determine which actions may have contextually contributed (e.g., based on relevance) to the success.

In 514, call center system 400 may suggest phrases that are considered relevant to previous successful outcomes of similar callers to be selected and communicated to call agent 104. For example, call agent will receive phrases displayed on their computer screen. Phrases may include, or be combined with, negative sentiment/emotion diffusing phrases, additional contextual information, such as product descriptions, product suggestions, customer options or steps that may provide technical assistance.

In 516, call center system 400 may provide alerts to a screen of the call agent. For example, alerts may be designated in various categories, such as, important, critical, helpful support or manager needed. The alerts may be based on the sentiment score crossing various thresholds, triggering varying levels of assistance and associated alerts. A call agent may subsequently select the alert (e.g., with cursor) and receive suggested phrasing to assist the customer.

Figure 6:
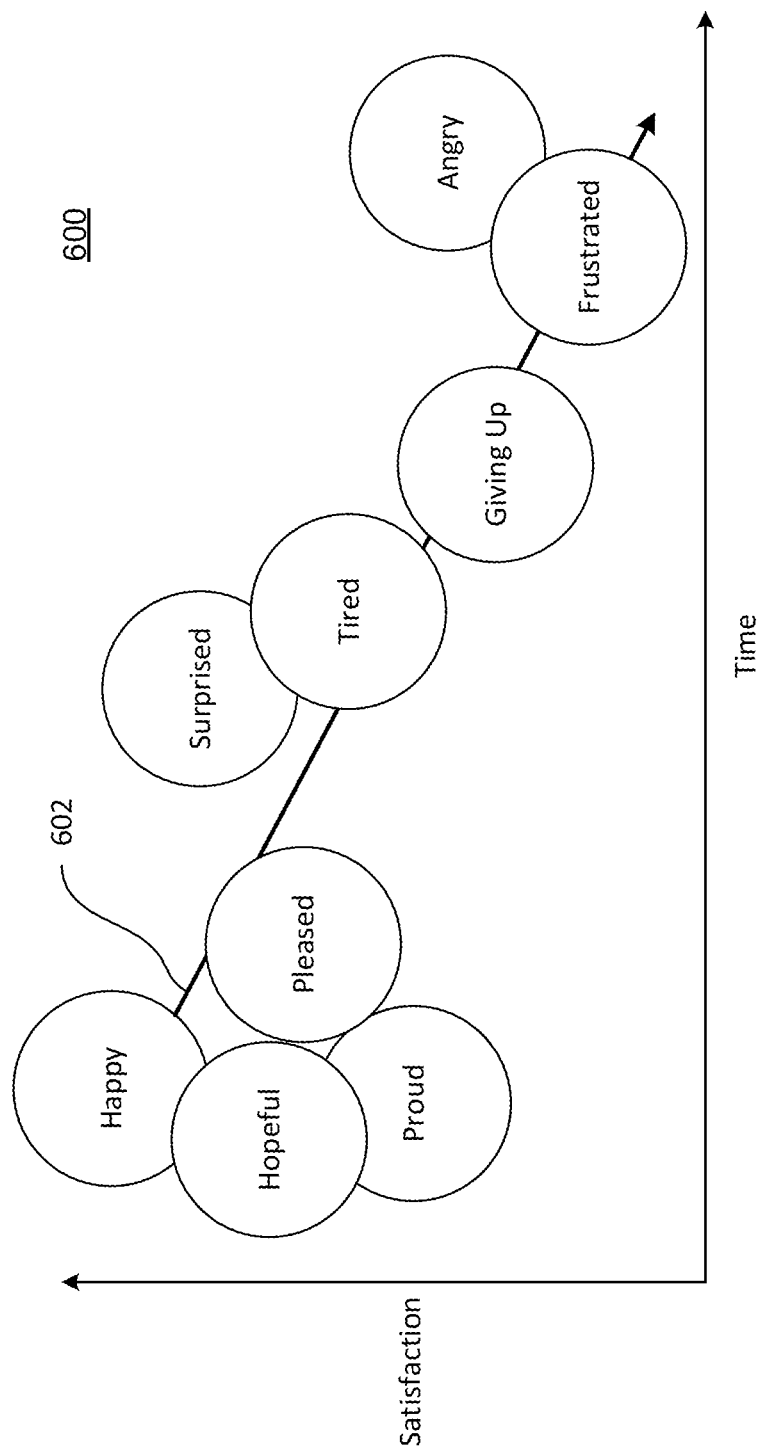
FIG. 6 illustrates a graph of groupings of caller emotions, as per some embodiments.

FIG. 6 illustrates a graph of groupings of emotions 600, as per some embodiments. As shown, a downward (negative) trend 602 of emotions may lead to a bad customer experience. Satisfactions such as happy, hopeful, proud, pleased may be recognized as positive emotional states. However, over time, these emotions may become less positive. Emotions such as surprised and tired may ultimately cascade quickly downward to highly negative emotions such as giving up, frustrated and ultimately anger. The technology disclosed herein detects these various emotions as well as providing real-time call agent assistance in attempt to stem and reverse this negative emotional movement over time and resolve the pertinent issues quickly and effectively.

FIG. 7 illustrates an example of real-time support for agents, as per some embodiments. In first example embodiment 700, an "Important Alert" category 708 is a result of a detection of a negative sentiment to include the emotion "Frustrated".

Call agents may only see the simplified view on the left (agent view 702) and feedback 706 is only shown if agents click on the important alert 708. The feedback is intended to be used directly in a current conversation. This way, agents do not have to process feedback and reformulate it to sound natural. The feedback is generated by the system using Natural Language Processor 200. On the backend 704, customer sentiment (frustrated), sentiment (from 4 to 2), and Tier 1 complaint likelihood are predicted (shown as detected on right). These are analyzed for trends to determine current satisfaction level. The category of the alert is determined based on satisfaction level. To provide actionable feedback, similar customers are identified (e.g., in two groups) and solutions leading to their high satisfaction (e.g., sentiment) are provided to agents (e.g., interest in installment programs).

FIG. 8 illustrates an example of real-time support for agents, as per some embodiments. In first example embodiment 800, a "Helpful Support" category 808 is shown. Note that these categories can be changed based on agent needs and are not limited to these examples.

As discussed above, call agents may only see the simplified view 802 on the left and feedback 806 is only shown if agents click on the helpful support alert 808. The feedback is intended to be used directly in conversation. This way, agents do not have to process feedback and reformulate it to sound natural. The feedback is generated by the system using Natural Language Generation (NLG). On the backend 804, customer sentiment (shown as tired), sentiment score 3, and Tier 1 complaint likelihood (high) are predicted (shown on right). These are analyzed for trends (downward trajectory score 3 to 5) to determine current satisfaction level. The category of the alert 808 is determined based on satisfaction level. To provide actionable feedback, similar customers (three groups) are identified and solutions leading to their high satisfaction (e.g., sentiment) are provided to agents (discussing/viewing past statements).

Figure 9:
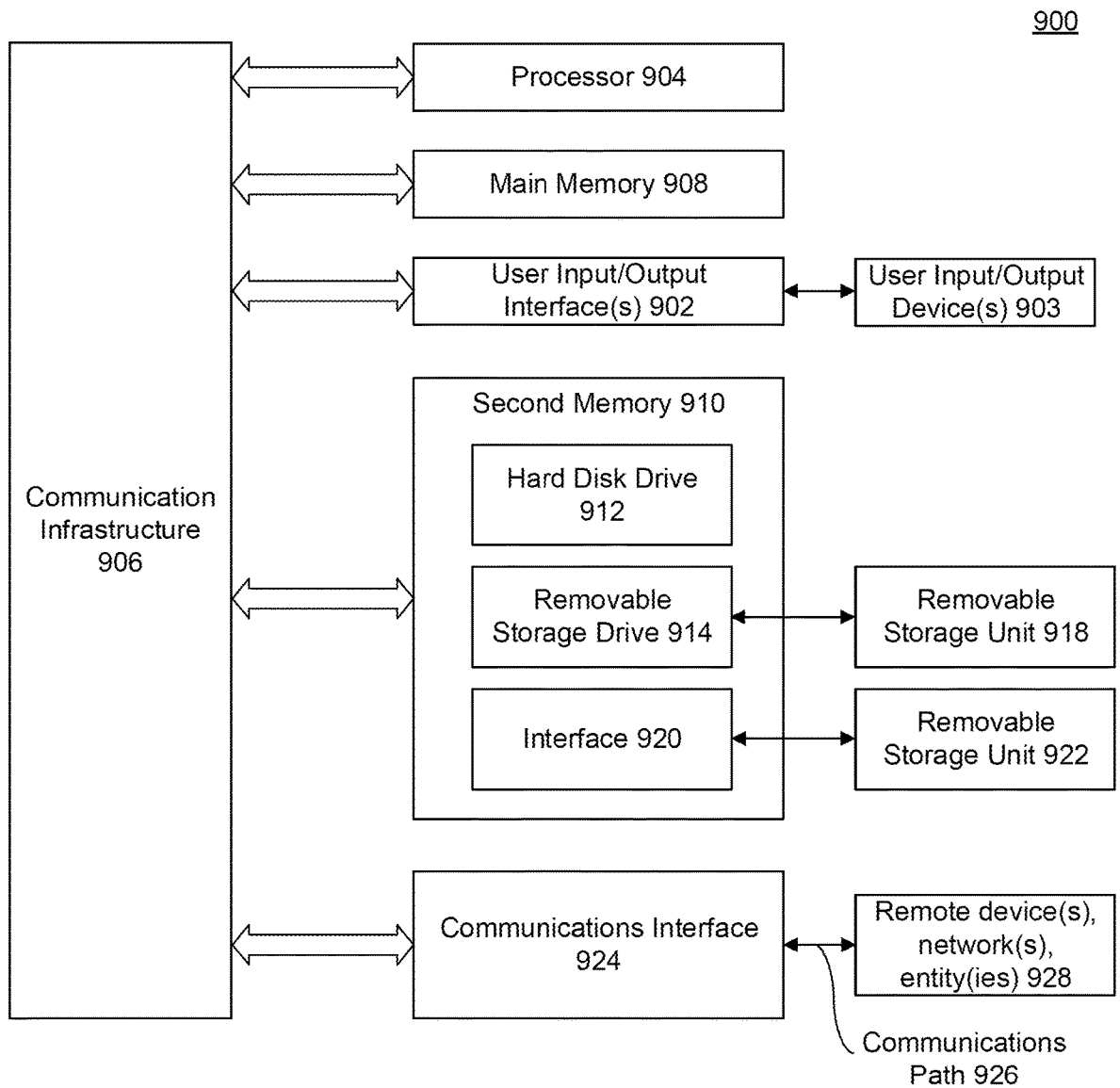
FIG. 9 is an example computer system useful for implementing various embodiments.

Various embodiments can be implemented, for example, using one or more computer systems, such as computer system 900 shown in FIG. 9. Computer system 900 can be used, for example, to implement method 500 of FIG. 5. For example, computer system 900 can identify complaints in call center calls. Computer system 900 can be any computer capable of performing the functions described herein. Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics-processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired, and/or wireless, and which may include any combination of LANs, WANs, the Internet, etc. Control logic and/or data may be transmitted to and from computer system 900 via communication path 926.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system comprising:
   a call routing service to route an incoming call to a call agent;
   a real-time dissatisfaction detector configured to:
      generate, in real-time, a call aspect-based sentiment classification based on one or more inferred sentiments of a current caller's speech, wherein the one or more inferred sentiments comprise one or more emotions and a respective aspect of the one or more emotions;
      predict, based on the one or more inferred sentiments, a sentiment score for each utterance of the current caller's speech;
      infer a sentiment trend based on the sentiment score predicted for each utterance of the current caller's speech; and
      predict, based on the sentiment trend, that a complaint is likely in upcoming utterances; and
   an automated assistance system, based on the complaint, configured to:
      search for one or more similar callers to the current caller;
      search for a successful call outcome associated with the one or more similar callers; and
      communicate, based on phrasing associated with the successful call outcome, one or more phrases to the call agent for use in a dialog with the current caller.

2. The system of claim 1, wherein the real-time dissatisfaction detector comprises at least a machine learning engine.

3. The system of claim 1, the real-time dissatisfaction detector is further configured to: identify, based on the one or more inferred sentiments comprising a negative sentiment, a corresponding negative emotion.

4. The system of claim 3, wherein the corresponding negative emotion comprises any of: anger, confusion, discontent, or dissatisfaction.

5. The system of claim 1, the automated assistance system is further configured to: infer the one or more similar callers based on a caller profile score.

6. The system of claim 5, the automated assistance system is further configured to: alert, based on the sentiment trend exceeding a threshold, personnel of a call center to join the current call or to provide additional assistance.

7. The system of claim 1, the automated assistance system is further configured to: identify, for the one or more similar callers, one or more actions by another call agent that provided the successful call outcome.

8. A computer implemented method for processing a call, comprising:
   routing, by a machine learning call routing model, an incoming call to a call agent;
   generating, by a real-time dissatisfaction detector, an aspect-based call classification of the incoming call based on one or more inferred sentiments of a current caller's speech, wherein the one or more inferred sentiments comprises one or more emotions and a respective aspect of the one or more emotions;

predicting, based on the one or more inferred sentiments, a sentiment score for each utterance of the current caller's speech;

inferring, by the real-time dissatisfaction detector, a sentiment trend based on the sentiment score predicted for each utterance of the current caller's speech; and predicting, by the real-time dissatisfaction detector and based on the sentiment trend, that a complaint is likely in upcoming utterances; and initiating, by an automated assistance system and based on the complaint, automated assistance comprising:
- searching, by the automated assistance system, for one or more similar callers to the current caller;
- searching, by the automated assistance system, for a successful call outcome associated with the one or more similar callers; and
- suggesting, by the automated assistance system and based on the successful call outcome, one or more phrases to the call agent for use in a dialog with the current caller.

9. The computer implemented method of claim 8, further comprising, identifying, where the one or more inferred sentiments comprises a negative sentiment, a corresponding negative emotion.

10. The computer implemented method of claim 9, wherein the corresponding negative emotion comprises any of: anger, confusion, discontent, or dissatisfaction.

11. The computer implemented method of claim 8, wherein the searching for one or more similar callers further comprises inferring a similarity based on a caller profile score.

12. The computer implemented method of claim 8, further comprising alerting, based on the sentiment trend exceeding a threshold, personnel of a call center to join the current call or to provide additional assistance.

13. The computer implemented method of claim 8, further comprising identifying, for the one or more similar callers, one or more actions by another call agent that provided the successful call outcome.

14. The computer implemented method of claim 8, further comprising mapping call attributes to the one or more inferred sentiments.

15. A non-transitory computer-readable device having instructions stored thereon that, when executed by at least one computing device, causes the at least one computing device to perform operations comprising:

routing an incoming call to a call agent;

generating an aspect-based call classification of the incoming call based on one or more inferred sentiments of a current caller's speech, wherein the one or more inferred sentiments comprises one or more emotions and a respective aspect of the one or more emotions;

predicting, based on the one or more inferred sentiments, a sentiment score for each utterance of the current caller's speech;

inferring, by a real-time dissatisfaction detector, a sentiment trend based on the sentiment score predicted for each utterance of the current caller's speech; and predicting, based on the sentiment trend, that a complaint is likely in upcoming utterances; and initiating, based on the complaint, automated assistance comprising:
- searching for one or more similar callers to the current caller;
- searching for a successful call outcome associated with the one or more similar callers; and
- suggesting, based on the successful call outcome, one or more phrases to the call agent for use in a dialog with the current caller to improve the one or more inferred sentiments.

16. The non-transitory computer-readable device of claim 15 further configured to perform operations comprising:
inferring the one or more similar callers based on a caller profile score.

17. The non-transitory computer-readable device of claim 15 further configured to perform operations comprising:
alerting, based on the sentiment trend exceeding a threshold, personnel of a call center to join the current call or to provide additional assistance.

* * * * *